(No Model.)
T. H. LUDINGTON.
Milk Strainer.
No. 230,301. Patented July 20, 1880.
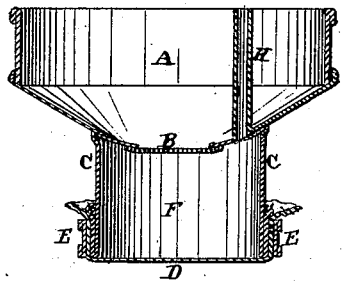
Witnesses
W. W. Mortimer.
W. H. Kern.
Inventor
Thos. H. Ludington,
per
F. A. Lehmann,
Atty.
N. PETERS, PHOTO-LITHOGRAPHER, WASHINGTON, D. C.

UNITED STATES PATENT OFFICE.

THOMAS H. LUDINGTON, OF BOVINA VALLEY, NEW YORK.

MILK-STRAINER.

SPECIFICATION forming part of Letters Patent No. 230,301, dated July 20, 1880.

Application filed May 22, 1880. (No model.)

*To all whom it may concern:*

Be it known that I, THOMAS H. LUDINGTON, of Bovina Valley, in the county of Delaware and State of New York, have invented certain new and useful Improvements in Milk-Strainers; and I do hereby declare the following to be a full, clear, and exact description of the invention, such as will enable others skilled in the art to which it pertains to make and use it, reference being had to the accompanying drawing, which forms part of this specification.

My invention relates to an improvement in strainers for milk-pails; and it consists in the combination of a wire strainer above and a flannel or other textile strainer below, there being an air-chamber between the two strainers, which is provided with a vent-tube for the air, as will be more fully described hereinafter.

The accompanying drawing represents a vertical section of my invention.

A represents a vessel, either of the shape here shown or any other that may be preferred, and which has the wire strainer B in its bottom. Projecting downward from the under side of this vessel A is the flange C, upon the lower end of which flange is placed a flannel or other suitable strainer, D, which is held in place by means of the ring E. Between these two strainers B and D there is an air-chamber, F, and in order to give vent to the air which is confined in this chamber, and to the air which will rise up from the milk-can as it is being filled with milk, there is provided the air-tube H, which extends up to the top of the vessel A, as shown.

By the use of this vent-tube the upward escape of the air through the milk, and the consequent splashing of the milk over the edges of the vessel A, is entirely prevented, and the straining can be carried on much more rapidly and conveniently.

By using two strainers, as here shown, all impurities in the milk are very thoroughly removed.

The lower strainer being detachable, both of the strainers can be readily washed after the straining is done.

Having thus described my invention, I claim—

1. A milk-strainer composed of the vessel A, provided with the strainer B in its bottom, a strainer, D, air-chamber F, and a vent-tube, H, the parts being arranged to operate substantially as shown.

2. A milk-strainer provided with two strainers and having an air-chamber between the two and a vent-tube for the air, substantially as set forth.

In testimony that I claim the foregoing I have hereunto set my hand this 17th day of May, 1880.

THOMAS H. LUDINGTON.

Witnesses:
 THOMAS C. STRANGEWAY,
 HOMER C. BURGIN.